United States Patent [19]

Cook

[11] 4,146,699

[45] Mar. 27, 1979

[54] PROCESS FOR MAKING AND/OR MODIFYING POLYURETHANES

[75] Inventor: William H. Cook, Bloomfield Hills, Mich.

[73] Assignee: Kemerica, Inc., Bloomfield Hills, Mich.

[21] Appl. No.: 784,257

[22] Filed: Apr. 4, 1977

[51] Int. Cl.$^2$ .................. C08J 11/04; C08K 5/17; C08K 5/20

[52] U.S. Cl. .................. 528/46; 260/32.6 N; 260/33.4 UR; 260/33.6 UB; 528/46

[58] Field of Search ............ 260/2.3, 75 NA, 77.5 A, 260/77.55 S; 526/492

[56] References Cited

U.S. PATENT DOCUMENTS

| | | | |
|---|---|---|---|
| 2,917,471 | 12/1959 | Nelson | 260/2.3 |
| 3,117,940 | 1/1964 | McElroy | 260/2.3 |
| 3,192,185 | 6/1965 | Achterhof et al. | 260/77.5 AA |
| 3,404,103 | 10/1968 | Matsudaira et al. | 260/2.3 |
| 4,039,568 | 8/1977 | Sakai et al. | 260/2.3 |

*Primary Examiner*—H.S. Cockeram
*Attorney, Agent, or Firm*—Gordon W. Hueschen

[57] ABSTRACT

Polyurethane resins of higher than desired molecular weight with or without gel fractions which comprise insoluble material due to crosslinking or excessive degree of polymerization are treated with a liquid or gaseous primary or secondary amine under thermal conditions which cause aminolysis of both linear linkages and cross linkages. By this procedure, the average molecular weights of the products can be reduced to acceptable levels. Also, if the product contains gel fractions, these too can be reduced to negligible levels. The procedure is applicable to both polyether and polyester urethanes and is effective to provide improved polymer characteristics for solution applications.

19 Claims, No Drawings

PROCESS FOR MAKING AND/OR MODIFYING POLYURETHANES

BACKGROUND OF THE INVENTION

1. Field of Invention

The invention relates to a process for treating polyurethanes, especially thermoplastically processable polyurethanes, to reduce the molecular weight thereof. More particularly, the invention is directed to processes for treating such polyurethanes as contain gel fractions, which comprise insoluble matter due to crosslinking, or excessive degree of polymerization, atypical polymermization, or like mechanisms, in order to eliminate or substantially reduce these gel fractions and/or to lower the molecular weight of the polymer.

Thermoplastically processable polyurethanes have been produced commercially for more than 20 years. The majority of products which are of industrial importance at the present are prepared by reaction of 4,4'-diphenylmethane diisocyanate with (1) an aliphatic polyesterdiol such as hydroxyl-terminated poly(1,4-butylene adipate) or an aliphatic polyetherdiol such as hydroxyl-terminated poly(oxytetramethylene) and (2) a diol chain extender such as 1,4-butanediol or 1,4-bis(2-hydroxyethoxy)benzene. Some of the commercially available polymers are predominantly hydroxyl-terminated, while others are prepared with a slight stoichiometric excess of isocyanate and are predominantly isocyanate-terminated. The latter polymers undergo further reaction upon elevated temperature post curing or aging in the presence of atmospheric moisture, and may become crosslinked. All of these polymers commonly are processed into shaped articles by means of thermoplastic processing techniques such as injection molding, extrusion, calendering, and blow molding. Many of the polymers, particularly those predominantly hydroxyl-terminated, are soluble in dipolar aprotic solvents such as tetrahydrofuran, dimethylformamide, cyclohexanone and dioxane, and as solutions in these and other solvents, find a variety of applications as coatings and adhesives.

For applications in solution, it is highly desirable if not essential that under given conditions of temperature, concentration of polymer and choice of solvent, the viscosity be within certain limits. Moreover, when thin films or coatings are to be prepared from the solutions, it is important that the polymer be entirely soluble, i.e., free of particles of crosslinked polymer commonly called "gel". It is difficult to produce consistently thermoplastic polyurethanes which are free of gel. Furthermore, it is equally difficult to achieve precise molecular weight control, and therefore solution viscosity control, in commercial manufacture of the thermoplastics. In addition, even nominally OH-terminated thermoplastic polyurethanes generally contain a residuum of NCO groups sufficient to cause marked increases in molecular weight within normal periods of storage required in commercial applications prior to final usage of the thermoplastic. Of those products which have viscosity specifications, in many cases the dilute solution viscosity may vary as much as by a factor of two, and even with this generous allowance for variation of the molecular weight, a considerable amount of material is produced which is out-of-specification.

In many coatings and adhesives applications, it would be desirable to reproduce solution viscosity of a given type of polyurethane thermoplastic to within ± 20 percent, or even less, of a predetermined level without changing the temperature, polymer concentration, or composition of the solvent. Up to the present time, this has not been generally possible. Furthermore, many lots of material offering the desired viscosity characteristics are rejected due to gel content. Also, where thin articles are produced, it is highly desirable to utilize polymers of low gel content. Nevertheless, it is typical to find a noticeable and objectionable amount of gel particles, for example, in polyurethane film manufactured from in-specification lots of polymer.

Also, the storage stability of many polyurethane thermoplastics, both as solids and in solution, has been a problem. If free isocyanate is present in the polymer, it is inherently unstable and tends to increase in molecular weight. This is particularly troublesome when the polymer is exposed to moisture. When the polymer is to undergo thermoplastic processing, such aging leads to less favorable processing characteristics and physical properties in the articles produced. In the case of solution applications, the viscosity usually increases, the content of gel may increase, and/or the polymer may become less soluble.

OBJECTS OF THE INVENTION

It is an object of the invention to provide an improved process for modifying polyurethane polymers. It is a further object of the invention to provide a process for reducing the molecular weight of polyurethane polymers. It is a further object of the invention to provide a process for eliminating or reducing the amount of gel fractions in polyurethane polymers. It is a further object of the invention to provide a process for the recovery of off-grade polyurethane polymers. It is a further object of the invention to provide a process for upgrading polyurethane polymers. A still further object of the invention is to provide a process which obviates difficulties heretofore encountered in the prior art and which has advantages as will be more particularly pointed out as the description proceeds.

BRIEF DESCRIPTION OF THE INVENTION

The invention relates to a process for treating polyurethane polymers, especially thermoplastically processable polyurethane polymers, of higher-than-desired molecular weight with a primary or secondary amine under conditions which cause aminolysis of both linear linkages and crosslinkages characteristic of the polyurethane being treated. Still more particularly, the invention relates to such a process which simultaneously effects reduction of gel fractions in the polyurethane polymer, which gel fractions comprise insoluble material due to crosslinking, excessive degree of polymerization, atypical polymerization, or like mechanisms.

While the invention is particularly applicable to thermoplastically processable polyurethanes, which term is to be understood to include those polyurethanes intended for solvent applications as well as for thermoforming, it is to be understood that it is broadly applicable to polyurethanes, including thermosetting types, where it is desired to effect a reduction of the molecular weight either of the basic polymer per se, or of high molecular weight and/or inclusions due to crosslinking, excess degree of polymerization, atypical polymerization, and like mechanisms which may occur during manufacture and/or storage of the polyurethane.

In carrying out the processes of the invention, the polyurethane polymer is exposed to the primary or secondary amine under conditions effective to cause diffusion of the amine throughout the polymer, and then, simultaneously therewith, or, subsequently thereto, the amine-treated polymer is heated for a time and at a temperature effective to cause the desired degree of aminolysis.

In this process, the amine attacks such linkages as ester linkages, urethane linkages, allophanate linkages, and the like, which may be present in the polyurethane. It is effective in causing scission of these linkages whether they are linear linkages or cross-linkages. Through control of the amount of amine and of the time and temperature of the thermal treatment, the process can be tailor-made to achieve either reduction of molecular weight or reduction of molecular weight coupled with lowering or removing gel fractions contained in the polymer. Generally speaking, additional time for diffusion of the amine is required for the breakdown of the gel fractions because it takes longer for the amine to diffuse into the suspended gel particles. Therefore, a longer time at a lower temperature, i.e., low enough so that substantial aminolysis does not take place prior to diffusion of amine throughout the gel, is required than for simple reduction of molecular weight of ungelled material. In any case, the temperature should be low enough to prevent degradation of the resin by mechanisms other than scission of the aforementioned groups by the amine, as such other mechanisms may produce an off-color product or one not having the desired characteristics of thermoplasticity, elasticity, and the like.

In carrying out the processes of the invention, the polyurethane polymer to be treated is exposed to the primary or secondary amine under conditions of time and temperature effective to cause diffusion of the amine into the polymer and the amine-treated polyurethane polymer thereafter is heated to a temperature effective to cause aminolysis for a time sufficient to accomplish the desired reduction in molecular weight. Advantageously, the polyurethane polymer is treated with the amine at a temperature below that at which substantial aminolysis takes place for a time sufficient to obtain effective diffusion of the amine into the polymer, including any gel fractions contained therein. The polymer may be heated to speed up this diffusion, advantageously, up to a temperature not greater than about 60° C. to promote diffusion of the amine into the polymer.

The primary or secondary amine can be added to dissolved polyurethane, or the amine can be dissolved in the solvent used for dissolving the polyurethane granules. If amine is added to a solution of polyurethane at a temperature high enough to cause rapid aminolysis, the rate of mixing must be sufficiently rapid to assure uniform dissolution of the amine in a still shorter time than that required for any appreciable aminolysis to occur. Similarly, when solid polyurethane is added to a solvent containing amine, this must be done at a temperature below that at which aminolysis occurs at an appreciable rate, and adequate time must be allowed for diffusion of amine into the solid particles before raising the temperature of the dispersion above the aminolysis temperature, that is to say, the temperature at which aminolysis occurs at a substantial rate. The aminolysis temperature varies according to the reactivity of the particular amine. In general, however, aminolysis begins to proceed at a substantial rate at about 60° C., particularly with secondary amines, though with some of the more reactive primary amines, the aminolysis temperature may be somewhat lower.

The amine-treated polymer then is heated to a temperature sufficient to effect aminolysis and the temperature is maintained for a time sufficient to obtain the desired reduction in molecular weight and/or gel fractions. Ordinarily, this temperature can range from above about 60° C., or somewhat lower, if the amine is highly reactive, to not more than about 120° C. Higher temperatures can be used, however, up to the temperature at which thermal degradation occurs at an objectionable rate. It is possible in some instances for diffusion and aminolysis to take place concomitantly, but generally it is desirable that diffusion be substantially complete before appreciable aminolysis is allowed to occur.

The amount of amine required to effect its purpose in the process of the invention is relatively small, and depends upon the particular amine used as well as upon other processing variable such as time and temperature variables. In general, there will be a residuum of unreacted amine in the treated polyurethane unless relative extremes of time and/or temperature are employed during the aminolysis phase of the process, or unless there is employed a subsequent processing step designed to remove or destroy such residuum of unreacted amine. Effective reduction in molecular weight, together with breakdown of any gel fractions present, ordinarily is obtained with less than 1 weight percent of amine, based on dibutylamine and the weight of the polymer. Higher amounts, up to 5 percent or even more can be used when there is substantial unreacted isocyanate present in the polymer and/or extensive crosslinking and/or when the conditions of aminolysis employed do not provide for substantially complete reaction of the amine. Also, it might be necessary to employ such higher amounts of amine if there were incomplete diffusion of amine prior to aminolysis. In such an instance, however, there would be extensive degradation (through aminolysis) of that portion of the polymer into which the amine had diffused prior to aminolysis, and the physical properties of the overall product, after treatment, generally would be seriously harmed. In any case, the equivalent of 5 percent of dibutylamine, if uniformly diffused prior to aminolysis and then completely reacted with the polymer, is sufficient to cause a molecular weight reduction of most polymers beyond that consistent with preservation of normal polymer physical properties.

In general, it is not often necessary or desirable to exceed the equivalent of about 2 percent dibutylamine. The optimum amount for a given transformation under given processing conditions can be determined directly by experimentation. For each batch of off-grade polyurethane thermoplastic there is an experimentally determinable relationship between the amount of amine employed and the molecular weight (as conveniently observed in terms of solution viscosity) of the resulting treated polymer, other processing variables being held constant. The equivalent of 0.1 to 0.5 percent dibutylamine has been employed with complete success in the recovery of a wide variety of off-grade polyurethane thermoplastics, and even with such small amounts of amine there may be a residuum of unreacted amine in the polymer following successful recovery, unless such residuum is removed or otherwise eliminated. It is generally not necessary or desirable to employ less than the equivalent of about 0.01 percent dibutylamine. Where other amines are used, the proportions can be increased or decreased as necessary to account for higher or lower molecular weight and/or higher or lower aminolysis reactivity under given conditions relative to the molecular weight and reactivity of dibutylamine.

In carrying out the process of the invention, any basic primary or secondary amine, advantageously one having a $pK_b$ less than about 6, can be employed. The term amine as used herein is to be understood as referring to amines of this type. Suitable such secondary amines include dimethylamine, methylethylamine, diethylamine, ethylpropylamine, methylpropylamine, ethylisopropylamine, methylisopropylamine, dipropylamine, diisopropylamine, dibutylamine, diisobutylamine, methylbutylamine, ethylbutylamine, diamylamine, dihexylamine, diheptylamine, dioctylamine, di-2-ethylhexylamine, piperidine, tetrahydropyrrol, morpholine, N-methylethanolamine, diethanolamine, 2,6-dimethylmorpholine, methylcyclohexylamine, dicyclohexylamine, methylbenzylamine, and dibenzylamine. Suitable such primary amines include methylamine, ethylamine, propylamine, isopropylamine, butylamine, isobutylamine, secbutylamine, amylamine, isoamylamine, hexylamine, heptylamine, octylamine, 2-ethylhexylamine, decylamine, dodecylamine, tridecylamine, ethanolamine, isopropanolamine, and 3-aminopropanol-1.

When the amines are liquid at room temperature, they can be absorbed on granules of the polymer and allowed to diffuse into the granules. If the amines are not liquid, they can be dissolved in a solvent and similarly used, or the temperature can be raised high enough to liquefy them. Gaseous amines, such as dimethylamine, can be employed in closed systems and/or in a solvent.

Where it is an object to reduce the content of gel fractions, adequate diffusion of the amine into the polymer, including the gel fractions thereof, should be effected before applying heat sufficient to cause substantial aminolysis. Otherwise, non-uniform and overall inefficient action of the amine will result, and there will be some viscosity reduction accompanied by incomplete breakdown of the gel fractions.

In accordance with one form of the invention, the amine is added to the polymer in the granular form, preferably with at least some mechanical blending, and allowed to diffuse into the granules. For this purpose, amines which are non-solvents for the polyurethane polymer being treated are of particular advantage. When a non-solvent amine is used, the particles of the polymer do not agglomerate during the solid phase treatment. The term "non-solvent amine" as used herein is to be understood to mean an amine which is a sufficiently poor solvent for the polyurethane polymer undergoing treatment that it is absorbed by the particles or granules without causing them to stick together. For the most part, such non-solvent amines are unsubstituted, higher molecular weight primary or secondary aliphatic and cycloaliphatic amines, for example, those having at least 7 carbon atoms, such as methyl cyclohexylamine, dibutylamine, diamylamine, diisobutylamine, dihexylamine, dicyclohexylamine, dioctylamine, di-2-ethylhexylamine, and advantageously containing not more than twelve carbon atoms.

Amines having a "solvent action" on the solid particles, such as the lower primary and secondary amines containing from one to about six carbon atoms, advantageously may be dissolved in a small amount of an inert solvent so as to reduce or avoid the undesirable solvent action effects of the pure amines, which effects include the causing of agglomeration of the polymer particles. Suitable inert diluents for the amines include solvents which dissolve the particular amine in question and which also may tend to diffuse into the solid polymer, but not cause the polymer particles to agglomerate. Whether or not a given solvent/diluent for the amine is suitable depends in general upon which polyurethane is being treated. Lower aromatic hydrocarbons, such as benzene, toluene and the xylenes, are generally suitable, as are lower alcohols such as isopropyl alcohol. Alcohols, of course, tend to diffuse into the polymer and may compete with the amine, depending upon the relative amount of alcohol employed, for reaction with any residual isocyanate groups present in the polyurethane.

The amount of any diluent used can vary from much less than the amount of amine, such as ten percent of the weight of the amine, to any larger amount. In general, it is not desirable to use more diluent than can be absorbed by the polymer, as any liquid phase remaining after absorption will contain some of the amine and therefore will reduce the amount of amine absorbed by the polymer and immediately available for aminolysis at the beginning of the aminolysis step. Furthermore, an excessive amount of diluent may interfere with the dissolution process and/or have other deleterious effects in the course of the end use of the polyurethane solution.

The amine-treated granules, either immediately or after standing to promote diffusion of the amine, are incorporated in a suitable dipolar aprotic solvent, such as dimethylformamide, and stirred to promote dissolution of the polymer and diffusion of any amine in the liquid phase into the granules. If desired, instead of adding the amine to the polymer granules, it may be added to the solvent. In either case, stirring is initiated and continued with or without application of heat for a time sufficient to allow diffusion of the amine into the polymer. Some polymer-solvent combinations provide swelling of the granules before complete dissolution occurs, which phenomenon may facilitate penetration of any amine in the solvent phase into the solid particles. The temperature during this period can be gradually raised up to the limit above which substantial aminolysis would begin to take place, and the stirring is continued as long as necessary to effect diffusion of the amine.

Sometimes, however, the solution will become too thick to stir so that the temperature must be increased further. It is desirable in such cases to allow the amine to diffuse thoroughly through the granules before further attempting to dissolve them. If thorough diffusion is not obtained, neither uniform molecular weight reduction nor efficient breakdown of gel fractions results. Hence, the time and conditions must be adjusted to give good diffusion of the amine before aminolysis begins to take place at any substantial rate.

The solution or partial solution thus obtained is then heated as required to bring the temperature up to the point where aminolysis takes place at an effective rate, and heating and stirring continued until the desired reduction in molecular weight is obtained. From time to time, as may be indicated, additional solvent or amine can be added, so that in the end, a product having the desired viscosity and solids content can be obtained and, at the same time, one which is free of gel fractions. If amine is added during the heating period above about 70° C., the aforementioned precautions to prevent non-uniform aminolysis must be observed, however.

A wide range of temperature variations may be used in carrying out the process of the invention because it is a time:temperature relation which is essentially important.

As long as the temperature is sufficient for aminolysis to take place, but insufficient to cause thermal degradation of the polymer, any temperature can be used, it being understood that the lower the temperature, the longer the time will be required, and vice versa. In general, also, the shorter the time, the higher the temperature that can be used without excessive thermal degradation. Thus, in such case, the mixture of amine-treated granules and solvent can be heated rapidly with concomitant rapid stirring to temperatures up to 90° C., or higher, without deleteriously affecting the color, strength, and elasticity of many polymers. Also, if adequate diffusion of the amine throughout the polymer granules was obtained first, then the product also is essentially free of gel fractions and clear, colorless, strong, and elastic films can be drawn from the resulting product which, at the same time, has an acceptable molecular weight, from a starting polymer having a large amount of gel fractions and/or undesirably high molecular weight.

Alternatively, the mixture of amine-treated polymer and solvent, whether obtained by pre-treating polymer granules with the primary or secondary amine, or by incorporating the amine in the solvent, is slowly and gradually heated with rapid stirring over a considerable period before it is brought to a temperature at which aminolysis proceeds at a significant rate.

It will be understood that, as the polyurethane polymer starting materials contemplated by the invention differ widely in constitution and gel fraction content, no hard and fast rules can be set down as to precise temperatures, times, and amounts of amines. It may be said, however, that a gradual increase in temperature or heating over longer periods at low temperatures promotes diffusion. Consequently, the mixture of polymer, amine, and solvent should be heated slowly over a considerable period of time and, at the same time, the maximum temperature should be kept relatively low, preferably below about 120° C.

The invention is applicable to both the polyester-type polyurethanes and polyether-type polyurethanes, as well as other types of polyurethanes, and conditions generally effective for one type are effective for the other types.

DETAILED DESCRIPTION OF THE INVENTION

The invention may be more fully understood by reference to the following examples which are given by way of illustration only. Parts and percentages are by weight unless otherwise specified.

EXAMPLE 1

A 50 pound lot of hard (50 Shore D) thermoplastic polyesterurethane granules (Estane 5707) had a high solution viscosity in dimethylformamide (3.048 cps at 15 percent nonvolatile solids by weight [NVS] at 25° C.) and contained a significant amount of loosely cross-linked gel. The standard viscosity specification for this product is 670–1,290 cps at 15 percent NVS in dimethylformamide at 25° C.

A 100 g portion of the granules was weighed into a one-pint paint can, and 0.8 ml dibutylamine was added from a syringe. It was noted that the liquid amine wet the surface of the granulated solid polyurethane, but did not seem to be rapidly absorbed, nor did it cause the particles to stick together. The can was closed within one minute and then was shaken vigorously for about one minute so as to distribute the granules which had been wet by the amine among the bulk of the material. The can then was set aside at room temperature for five days. Upon opening, it was noted that there was no sticking together of the granules, and that no other visible changes had occurred. The odor of dibutylamine in the can was easily detectable, however.

To the granules in the can then was added 233 g of dimethylformamide, which immediately attacked the solid, causing the granules to stick together in clumps. This mixture was stirred at high speed with a stainless steel high-shear mixer with a two-inch blade powered by a ½ hp air motor. This type of mixer causes rather rapid heat-up of viscous materials due to the relatively large amount of energy dissipated. However, the liquid became so viscous as the granules dissolved that it was necessary to apply external heat in order to continue high-speed stirring after the first 30 minutes. After 10 minutes with externally applied heat, the temperature stabilized at 190° F., and high-speed stirring was continued at this temperature for 90 minutes longer. Films then were drawn onto glass plates using a 0.005″ Bird Applicator. The films were dried at 225° F. for ten minutes in a mechanical convection oven. When the plates had cooled to room temperature, the films were peeled off and examined. They were clear, colorless, very strong, and elastic, and contained only a few tiny imperfections due to minute gel particles within the film which could be seen with the aid of a microscope. The dry film thickness was measured and found to be 0.00135″.

The viscosity of the polyurethane solution then was measured, using a Brookfield RVT Viscometer with #4 Spindle at 1 rpm, and found to be 102,000 cps at 25° C. A portion of this solution then was diluted with dimethylformamide to 15 percent NVS, and the viscosity was found to be 1,000 cps at 25° F., well within the manufacturer's specification for Estane 5707.

EXAMPLE 2

A 400 g portion of the off-grade lot of Estane 5707 of Example 1 was weighed into a one-quart paint can and 3.0 ml dibutylamine was added from a syringe. The can was closed immediately and shaken intermittently for several minutes. It was set aside at room temperature for 13 days.

PART 2A

Then, a 134 g portion of the dibutylamine-treated granules was transferred to a two-liter resin pot equipped with agitator, heating mantle, thermometer, reflux condenser and nitrogen inlet. Dimethylformamide (247 g) then was added so as to provide 35 percent NVS, and stirring with gentle heating was begun immediately. After 45 minutes, the temperature had risen to 80° C. and there were still some undissolved solids. After an additional 75 minutes, the temperature had climbed to 94° C., and it was maintained at 94°–95° C. for another two hours while stirring briskly. Then the solution was poured into a one quart paint can while still hot. There were no visible gel particles. Several films were drawn with a 0.005″ Bird Applicator onto glass plates, which then were placed in an oven at 260° F. for 20 minutes. The films were of excellent quality—clear and substantially free of gel particles and other imperfections, and strong and highly elastic. The viscosity of the solution at 25° C. was found to be 109,800 cps, and after dilution to 15 percent NVS with dimethylformamide, 1,075 cps (within the manufacturer's specification).

PART 2B

A second 134 g portion of the dibutylamine-treated granules was weighed into a one-pint paint can and an additional 0.1 ml of dibutylamine was added from a syringe. The can was closed, shaken intermittently for several minutes and set aside at room temperature for 24 hours. The can was opened and the contents transferred to the resin pot dissolution assembly of Example 2. Then, 247 g of dimethylformamide was added and heating and stirring was begun immediately. A much faster rate of heating was employed, however, than in Part 2A, and after only 20 minutes the temperature had reached 100° C. Heating then was reduced and after one hour total stirring the product was examined and found to contain undissolved granules. Stirring at 90°–100° C. was continued for two hours longer and the product was transferred to a one pint paint can. A film drawn with a 0.005" Bird Applicator was found to contain a few small gel particles, but otherwise was of good quality. The viscosity of the solution at 25° C. was found to be 70,400 cps, and upon dilution to 15 percent NVS with dimethylformamide, 760 cps (within the manufacturer's specification). The results of this experiment, when compared with those of Part 2A, indicate that the faster heat-up rate and/or higher temperature of Part 2B were not as effective for reducing gel. However, nearly all gel was eliminated and the viscosity of the product was within the desired range. The fact that the viscosity was lower than the product of Part 2A is attributed partly to the larger amount of dibutylamine employed and partly to the higher average temperature while stirring.

PART 2C

The final 134 g portion of the dibutylamine-treated granules was transferred to a one-pint paint can and 0.2 ml additional dibutylamine was added from a syringe. The can was closed, shaken intermittently for several minutes and set aside at room temperature for seven days. The can was opened and the contents transferred to the resin pot dissolution assembly of Example 2. Then, 247 g dimethylformamide (to produce 35 percent NVS) was added and stirring and heating was begun immediately. After 30 minutes, the temperature had risen to 80° C., and after one hour total stirring, to 100° C. The heat then was turned off and the stirred mass allowed to come to an equilibrium temperature of 93° C. resulting from the energy input of the stirrer being exactly offset by the heat loss of the system. After three hours stirring without external application of heat, the stirring rate was reduced and stirring continued for another hour, at which point the temperature had dropped to 86° C. An 18-square-inch film was drawn onto a glass plate with a 0.005" Bird Applicator. After drying at 270° F. and being stripped from the plate, the film was found to contain only three minute gel particles. The viscosity of the solution at 25° C. was determined to be 94,600 cps, and after dilution to 15 percent NVS with dimethylformamide, 920 cps (near the center of the manufacturer's specification). These results, when compared with those of Parts 2A and 2B, indicate that better gel reduction is obtained, in this system, at temperatures below 100° C., and that higher temperatures and/or longer heating periods lead to lower final viscosities. In any case, precision control of viscosity reduction is obtained with nearly complete elimination of gel.

EXAMPLE 3

A 50-pound lot of relatively soft (74 Shore A) thermoplastic polyesterurethane granules (Estane 5710) had a high solution viscosity in tetrahydrofuran (1,900 cps at 15 percent NVS and 25° C.). The standard viscosity specification for this product is 400–800 cps at 25° C. and 15 percent NVS in tetrahydrofuran. This sample of Estane 5710 contains a large amount of small gel particles, which produce dozens of imperfections per square inch in films prepared from solutions of the untreated thermoplastic.

PART 3A

To a 100 g portion of the polyesterurethane thermoplastic granules of this example in a one-pint paint can was added 187 g dimethylformamide so as to provide 35 percent NVS. This mixture was stirred at high speed with the air-powered stirrer of Example 1. As the viscosity increased with dissolution of the granules, 47 g of toluene was added to reduce the viscosity and provide 30 percent NVS. Stirring was continued for a total of one hour, at which point the viscosity became too high to continue stirring without externally applied heat or further dilution. There were still undissolved granules present, and the can was closed and set aside at room temperature for five days. Then the can was opened and the contents stirred as rapidly as possible while heating to 190° F. on a hot plate. High speed stirring was continued for one hour at 190° F., during which time the granules appeared to dissolve. When the solution was coated onto a glass plate with a 0.005" Bird Applicator and dried at 225° F. for 10 minutes, it was found that numerous small particles were present.

PART 3B

Dibutylamine (0.4 ml) was added from a syringe to another 100 g portion of the polyesterurethane thermoplastic granules of this example in a one-pint can. The can then was closed and shaken for several minutes, and set aside at room temperature for seven days. The can then was opened, and it was noted that there was no evidence of sticking together of the granules. The granules were added steadily over a 25-minute period to 187 g dimethylformamide in the resin pot of Example 2 while stirring slowly and maintaining the temperature of the mixture at 75°–85° C. By the time the last of the granules was added, the solution had become very viscous at 80° C., and 47 g toluene was added (reducing the mixture to 30 percent NVS) while the temperature was increased to 110° C. One hour after the beginning of addition of the granules, a few small lumps still were present in the liquid. After another hour's stirring at 100°–110° C., the solids seemed to have dissolved. Stirring was continued for another 30 minutes at 90°–100° C., and then film I was drawn onto a glass plate using a 0.005" Bird Applicator. The film was dried at 270° F. for 10 minutes, and was found to contain only a few small gel particles. Meanwhile, heating and stirring of the solution at 90°–100° C. was continued for another 90 minutes, and film II was prepared. The content of gel particles in Film II was less than that of film I. Both films were vastly superior to the film of Part 3A on the basis of the number of particles present, and seemed to be at least as good in terms of color, strength, and elasticity. After standing for several days at room temperature, the viscosity of the solution (30 percent NVS) was determined to be 29,960 cps at 25° C.

PART 3C

To a 200 g portion of the polyesterurethane thermoplastic granules of this example in a one-pint can was added 1.0 ml of dibutylamine. The can was closed and shaken, and set aside at room temperature for 3 days. The contents then were added to 374 g dimethylformamide in the resin pot of Example 2 while stirring rapidly and maintaining the temperature at 35°–40° C. Within five minutes the viscosity became very high, and the temperature was increased steadily to 90° C. over the next 15 minutes while stirring rapidly. At this point the viscosity began to decrease. After 5 minutes longer, at 113° C., 92 g of toluene was added to provide 30 percent NVS. After another 30 minutes, the temperature reached a peak of 119° C., and the heat was turned off. Stirring was continued for another 150 minutes with low heat input, which maintained the temperature at 110°–115° C. during the last 2 hours. The solution then was clear and pale yellow. It was coated onto glass plates with a 0.005" Bird Applicator. The dried films were examined and found to contain more gel particles than did film II of Part 3B. After standing at room temperature for several days, the viscosity of the solution (30 percent NVS) was found to be 10,320 cps at 25° C. Upon further dilution to 15 percent NVS with tetrahydrofuran, the viscosity was 198 cps at 25° C. Although the solvent was not all tetrahydrofuran as specified for the commercial standard viscosity determination, but contained some dimethylformamide and toluene as well, these latter solvents provide higher solution viscosity than does tetrahydrofuran. Hence, if only tetrahydrofuran had been present in the final solution at 15 percent NVS, the viscosity would have been even lower than 198 cps.

The combined results of Parts 3A, 3B, and 3C illustrate several important features of the gel and viscosity reduction processes: Heating and stirring in solvent does not provide low-gel solutions. If a small amount of dibutylamine first is absorbed into the granules, however, both gel and solution viscosity are reduced. Heating rapidly to above 90° C. does provide viscosity reduction and dissolution of much of the insoluble material, but yellowing sets in. Also, it is seen that even small amounts of dibutylamine under these conditions can lead to viscosities below the recommendations of the manufacturer of the thermoplastic.

PART 3D

To another 200 g portion of the polyesterurethane thermoplastic granules of this example was added 1.0 ml of dibutylamine. The mixture was shaken in a one-pint closed can and set aside at room temperature for 24 hours. Then the granules were transferred to the resin pot of Example 2 and 375 g of dimethylformamide was added. Vigorous stirring was begun immediately, before the granules began to stick together, and gentle heating was begun. After seven minutes the temperature had risen to 46° C. and the mixture was becoming viscous. After a total of 10 minutes stirring the temperature was 63° C., and after another 5 minutes, 79° C. The heat then was turned off, and vigorous stirring was continued. After a total of 55 minutes stirring, the temperature had increased to a peak of 99° C., much of which increase apparently was due to the energy input of the stirrer. At this point the solids appeared to have dissolved, and the solution was nearly colorless. Stirring was continued an additional 180 minutes without heat, during which period the temperature dropped and was maintained in the range of 83°–95° C. through control of the stirrer speed. A film then was drawn onto a glass plate with a 0.005" Bird Applicator, and dried in an oven. The 2×9-inch film contained only one tiny gel particle. The solution then was diluted to 30 percent NVS with 92 g of toluene. After standing several days at room temperature, the viscosity was found to be 27,320 cps at 25° C., and upon dilution to 15 percent NVS with tetrahydrofuran, 540 cps.

PART 3E

A third 200 g portion of the polyesterurethane thermoplastic granules of this example was weighed into a one pint can and 0.6 ml dibutylamine was added. The can was closed and shaken and set aside at room temperature for 24 hours.

PART 3E-1

A 45 g portion of the dibutylamine-treated granules was then transferred to the resin pot of Example 2 and 255 g tetrahydrofuran (to provide 15 percent NVS) was added. The mixture was stirred without heat for one hour, during which period most of the granules dissolved, and the undissolved particles were not sticking together. The resin pot containing partially dissolved granules was set aside at room temperature for six days. The mixture then was heated to reflux (about 65° C.) and was stirred under reflux for four hours. Upon cooling to room temperature, the solution was examined and found to contain many sizeable particles (but smaller than the original granules) which did not tend to stick together as is usually the case with soluble particles of this polymer undergoing dissolution in tetrahydrofuran. It was concluded that these particles were gel particles.

PART 3E-2

The remaining 155 g portion of dibutylamine-treated granules, after having stood at room temperature for 24 days, was transferred to the resin pot of Example 2 and 288 g dimethylformamide was added (to provide 35 percent NVS). Stirring was begun immediately, and after one hour the temperature had increased to 40° C. At this point much of the solid material was undissolved and the original particles were sticking together in balls. After 160 minutes additional stirring, the temperature was 45° C. Heat was applied to raise the temperature to 60° C., and 0.3 ml additional dibutylamine was added. Stirring then was continued for two hours longer at 55°–65° C., and the viscous, nearly colorless product was examined. It was found to contain a few small, and many tiny gel particles. After standing at room temperature for several days, the viscosity of this product was 153,600 cps at 25° C. Upon dilution to 30 percent NVS with toluene, the viscosity was 51,760 cps at 19° C., and upon further dilution to 15 percent NVS with tetrahydrofuran, 754 cps at 18° C.

The results of Parts 3D, 3E-1, and 3E-2 indicate that, at least in the case of the particular polyesterurethane thermoplastic being investigated, heating dibutylamine-treated granules in dimethylformamide at a temperature above 65° C. but below 100° C. for several hours is sufficient to being about viscosity reduction as well as dissolution of gel. Furthermore, at 55°–65° C., even additional dibutylamine does not result in substantial elimination of gel within the time limits of the heating periods investigated. Also, the amount of viscosity reduction achieved depends not only upon the amount of dibutylamine employed, but upon the time-temperature program employed at temperatures above about 65° C. The fact that more complete gel dissolution was achieved by means of the more moderate time-temperature program of Part 3D as compared with Parts 3B and 3C, indicates that diffusion of dibutylamine into gel occurs, at least in part, during the period between the beginning of heating and the completion of the reaction of the amine with the polymer. The amine-polymer reaction clearly occurs at a useful rate at temperatures somewhat above 65° C., but if the rate of temperature increase above 65° C. is too great, much of the amine will react before adequate diffusion into the gel has occurred. This will result in viscosity reduction with less than adequate dissolution of gel.

EXAMPLE 4

A lot of an intermediate-hardness (87 Shore A) polyesterurethane thermoplastic granules Estane 5701 F1 was obtained from an industrial user of such materials who manufactures fabric and leather coatings from them. This lot was claimed to be too high in molecular weight and to contain an objectionable amount of gel. The viscosity preferred by the user for this product in 80 percent/20 percent dimethylformamide/toluene solution at 30 percent NVS and 25° C. is 30,000 cps. The specification of the manufacturer of the thermoplastic is 300–700 cps at 15 percent NVS in tetrahydrofuran at 25° C. It was found to have a viscosity of 600 cps at 15 percent NVS in tetrahydrofuran at 25° C.

PART 4A

A 200 g portion of this material was weighed into a one-quart can and 1.0 ml dibutylamine was added. The can was closed and rolled for 20 minutes on an electric can roller. The granules then were transferred to the resin pot of Example 2 and 374.5 g dimethylformamide was added. Stirring was begun immediately, and after 10 minutes gentle heat was applied. Twenty minutes thereafter the viscosity was very high, and there was much undissolved material with the temperature at 45° C. Stirring was continued while the temperature increased slowly. Eighty-five minutes after the beginning of stirring the temperature was 68° C., the viscosity was reduced, and there appeared to be no undissolved granules. During the next 130 minutes the temperature was increased gradually to 120° C. The heat was then turned off and the resin pot removed from the heating mantle. The product was found to have yellowed slightly. A film was drawn from the hot liquid onto a glass plate with a 0.005" Bird Applicator and dried in an oven. The film contained many small and a few larger particles and was not as strong and resilient as is characteristic or normal films prepared from Estane 5701 F1. The viscosity of the (35 percent NVS) solution at 25° C. was determined to be 33,600 cps, and, upon dilution to 30 percent NVS with toluene, 9,000 cps. It was concluded that the amount of dibutylamine employed together with the elevated temperature treatment had brought about excessive molecular weight reduction without complete dissolution of the gel contained in the thermoplastic.

PART 4B

A second 200 g portion of the polyesterurethane thermoplastic granules of this example was treated with 1.5 ml of dibutylamine, and the closed can was set aside at room temperature for 10 days. The granules then were transferred to the resin pot of Example 2 and 379 g dimethylformamide was added. Stirring and gentle heating was begun immediately. After 25 minutes the temperature had increased to 40° C.; after 50 minutes, to 50° C.; after 140 minutes, to 60° C,; after 181 minutes, to 88° C.; and, after 190 minutes, to 89° C. The heat was then turned off and the product allowed to cool slowly with moderate stirring. The temperature dropped to 81° C. 275 minutes after the addition of dimethylformamide and the beginning of stirring. A film then was drawn onto a glass plate as in Part 4A. This film was virtually free of undissolved polymer particles, was strong and elastic, and was of substantially better color than the film of Part 4A. After cooling to room temperature and standing for several days, the viscosity of the solution (35 percent NVS) was 60,160 cps at 25° C., and, after dilution to 30 percent NVS with toluene, 22,800 cps at 25° C.

The results of Parts 4A and 4B show that the elevated temperature treatment above 60° C., and not the amount of dibutylamine alone, was important in determining the amount of molecular weight reduction achieved as reflected by the solution viscosities of the polymers. Even though 50 percent more dibutylamine was employed in Part 4B than in Part 4A, the solution viscosity of the product was greater. It is concluded that the higher temperatures employed in Part 4A brought about the greater viscosity reduction, in spite of the lower amount of dibutylamine. Furthermore, it is concluded that a convenient rate of molecular weight reduction together with much improved breakdown of gel is achieved when the peak temperature is limited to about 90° C. as opposed to higher peak temperatures, which are less effective in reducing gel content of the polymer.

EXAMPLE 5

A 50 pound lot of off-grade polyetherurethane thermoplastic of 80 Shore A hardness (Estane 5714 F1) was not within normal product specifications due to its high solution viscosity and gel content. The viscosity specification for this product is 600–1,200 cps at 15 percent NVS in tetrahydrofuran at 25° C.

A 300 g portion of this lot of Estane 5714 F1 was weighed into a one-quart can and 1.5 ml dibutylamine was added. The can was closed and rolled on an electric roller for 30 minutes. There was no sticking together of the granules before or after rolling. The can was set aside at room temperature overnight and then 150 g of the granules was charged to the resin pot of Example 2 and 255 g dimethylformamide was added (for 40 percent NVS). Stirring was begun immediately without heat. After 10 minutes, it was apparent that there was not enough solvent to dissolve the granules, and 54 g additional dimethylformamide was added (for 35 percent NVS). Gentle heat was then applied. Twenty minutes thereafter the temperature was 65° C., and the viscosity, which had become extremely high, was decreasing. During the next 35 minutes the temperature increased steadily to 99° C., at which point the heat was turned off and it was noted that the pale yellow solution contained no visible undissolved solids. During the next 205 minutes vigorous stirring was maintained as the temperature steadily decreased to 85° C. Stirring then was stopped and a film was drawn onto a glass plate with a 0.005" Bird Applicator and dried in a 225° F. oven. The film was entirely free of gel particles and other flaws, and upon cooling was stripped from the plate and found to be strong and elastic. After standing at room temperature for several days, the viscosity of the solution was determined to be 188,000 cps at 25° C. Upon diluting one portion to 30 percent NVS with toluene, the viscosity was 81,600 cps. After diluting another portion to 30 percent NVS with methyl ethyl ketone, and further diluting this solution to 15 percent NVS with tetrahydrofuran, the viscosity of the 15 percent NVS solution at 25° C. was found to be 750 cps.

Since the dimethylformamide/methyl ethyl ketone solvent used to prepare the concentrate from which the final solution was prepared is known to produce nearly the same viscosity with this polymer as does tetrahydrofuran alone, it is concluded that the viscosity would have been within the manufacturer's viscosity specification had tetrahydrofuran been employed as the only solvent.

EXAMPLE 6

An off-grade lot of intermediate hardness (87 Shore A) polyesterurethane thermoplastic granules (Estane 5701 F1) was high in molecular weight and contained a substantial amount of gel.

PART 6A

A 300 g portion of the granules was weighed into a one-quart can and 2.0 ml dibutylamine was added. The can was closed and rolled for 20 minutes on an electric roller, then set aside at room temperature for three hours. To the resin pot of Example 2 then was added 150 g of the amine-treated granules and 350 g of cyclohexanone. Stirring and heating was begun immediately. After one hour the temperature reached 90° C. and the heat was turned off. With moderate stirring the temperature peaked at 95° C. 30 minutes later, and after 30 minutes more, dropped to 90° C. As undissolved solids were present, 250 g additional cyclohexanone was added (for 20 percent NVS) and stirring continued for another 30 minutes, at which point there was still a considerable quantity of soft lumps present. The product was allowed to stand overnight in the resin pot without stirring, and, as the viscosity still was very high, 0.4 ml additional dibutylamine and 250 g additional cyclohexanone were added to the product at room temperature (15 percent NVS). Over the next 210 minutes the product was heated and stirred. At the end of this period, the temperature reached 96° C. and no more lumps or particles were visible. A film was drawn onto a glass plate with a 0.005" Bird Applicator and dried in an oven. The film was nearly free of gel particles. After standing overnight at room temperature, the viscosity of the 15 percent NVS solution at 25° C. was found to be 4,820 cps. This surprisingly high viscosity is attributed partly to the characteristics of this polymer in cyclohexanone solution and partly to the very high molecular weight and gel content of the polymer prior to the heating with dibutylamine.

PART 6B

A 150 g portion of the lot of Estane 5701 F1 of this example was mixed with 1.5 ml dibutylamine in a one-pint can and set aside at room temperature for two days. The mixture was stirred slowly for 30 minutes without heat, and then was set aside at room temperature for four days in the closed resin pot. At this point the product consisted of a mass of swollen granules dispersed in a thick syrup. Heating and stirring was begun, and in 20 minutes the temperature reached 60° C. The temperature steadily increased over the next 120 minutes to a peak of 102° C. There was still a mass of swollen granules in the liquid, and 100 g additional cyclohexanone was added, which reduced the temperature to 65° C. During the next 20 minutes the temperature climbed back to 99° C., and the heat was turned off and the stirring rate reduced to allow cooling. There were still undissolved but swollen granules present. The product was set aside in the closed resin pot overnight, and then 0.6 ml additional dibutylamine was added and stirring with low heat was begun. After 90 minutes the temperature reached a peak of 87° C., and it was observed that the granules had dissolved completely. A 150 g portion of the product solution (25 percent NVS) was removed and diluted with 100 g of cyclohexanone to 15 percent NVS. After standing overnight, the viscosity of this 15 percent solution at 25° C. was 3,740 cps. To the remainder of the product solution in the resin pot was added 0.45 ml additional dibutylamine, and stirring with low heat was begun. It was noted that before heating, the solution had a "sugary" appearance and contained some small soft lumps not present at the end of heating on the previous day. This indicated the limit of solubility of the polymer at this molecular weight had been exceeded. During the next 85 minutes, the temperature reached a peak of 90° C. and the heat was turned off, but rapid stirring continued. After 175 minutes, the temperature had dropped to 75° C. Upon standing for three days at room temperature, the viscosity of the product was found to be 51,120 cps. A portion of it then was diluted to 15 percent NVS with cyclohexanone, and the viscosity at 25° C. was found to be 2,740 cps.

EXAMPLE 7

A lot of commercial polyurethane plastic granules was obtained from a supplier who reported that it was "extremely difficult to dissolve" because it had increased in molecular weight. The objective of recovery of this material was to convert it to a material soluble in dimethylformamide/toluene at 30–35% NVS so as to provide a gel-free solution of 30,000–40,000 cps at room temperature. The resin was inspected and found to consist of irregular white granules of maximum dimension varying from about one-eighth to about one-half inch, and some of the individual particles were observed to contain many small bubbles.

PART 7A

A 100 g portion of the above resin was weighed into a one-pint paint can and 4.4 ml diethylamine was added. The diethylamine softened the granules immediately, so that they stuck together in large clumps, which could not be broken apart with a spatula. The can was closed and set aside.

The next day the can was opened and the strong odor of diethylamine was noted. Dimethylformamide (187 g) was added and the mixture was stirred rapidly with the air-driven stirrer of Example 1. The granules seemed to dissolve more rapidly than in experiments where dibutylamine had been used, but the solution rapidly became too viscous to stir; after 30 minutes' stirring, 47 g toluene was added and stirring continued for another thirty minutes, at which point the mixture again was too viscous, even at 60° C., and contained large, swollen granules. One ml (1.0 ml) morpholine was added, and stirring at 60° C. continued. There was quickly a viscosity reduction; then, after five to ten minutes, the viscosity again increased to a very high level as more granules dissolved. The can was closed and set aside. On the next day the can was opened and examined. Although the viscosity had dropped, there were still many large, swollen granules and the solution was too viscous to stir rapidly. While stirring as fast as possible, it was heated on a hot plate to 105°–110° C.; the granules dissolved completely before reaching this temperature, but the viscosity was quite high considering the high temperature. The hot plate was removed while continuing the stirring, and 2.4 ml morpholine was added and quickly stirred in. Within a few minutes, a substantial drop in viscosity was observed. No undissolved material was detected even upon cooling to room temperature.

PART 7B

A 200 g portion of the above resin was weighed into a one-pint can and 7.45 ml morpholine was added. The morpholine immediately attacked the granules, making them sticky, so that they stuck together in large clumps. (This is in contrast to the action of dibutylamine, which seems to be slowly absorbed by the granules, but which does not make them sticky). After one hour, 96 g toluene was added for the purpose of aiding distribution of morpholine throughout the can. The toluene also seemed to attack the granules. The can was closed. On the next day the can was opened and found to contain a single cluster of mostly transparent granules, somewhat swollen. All of the toluene had been absorbed. This mass was transferred to a two-liter resin pot and 137 g additional toluene and 233 g dimethylformamide was added. This mixture was heated rapidly and stirred. After one hour of stirring at 105°–110° C., the product was cooled and transferred to cans. Some gel particles remained, but most of the granules appeared to have dissolved. On the next day a portion of the above was agitated for fifteen minutes at high-seed, high-shear, while heating to about 60° C. The solution was then coated (0.005 inch wet film) on an aluminum panel and dried at 275° F. The film was nearly perfect. The viscosity of the 30% NVS solution at 23° C. was found to be 24,600 cps.

EXAMPLE 8

A thirty g portion of the granulated thermoplastic polyurethane of Example 6 was weighed into a one-pint paint can and 170 g tetrahydrofuran was added (for 15% NVS). This mixture was stirred with the air-driven mixer of Example 1, with addition of tetrahydrofuran as necessary to make up for evaporation losses. There was extensive swelling of the granules as they dissolved, and after about 45 minutes of stirring all solids had dissolved except for a small weight fraction of tiny gel particles. The viscosity of this solution at 18° C. was 1,860 cps, clearly much above the manufacturer's upper specification limit of 700 cps at 25° C.

To a 200 g portion of the polyurethane thermoplastic granules was added, in a one-pint can, 0.3 ml of a 71.6% aqueous solution of ethylamine. The amine solution did not cause the granules to stick together. The can was closed and set aside at room temperature for two days. Then the granules were transferred to the resin pot of Example 2 and 372 g dimethylformamide was added (for 35% NVS) and stirring and gentle heating begun immediately. After one hour the temperature reached 60° C., and after another hour, 89° C. Stirring was continued for two hours longer at 85°–90° C., during which time the granules appeared to dissolve completely. Then 95 g toluene was added (for 30% NVS) and slow stirring continued for another 45 minutes while the temperature dropped to 65° C. The solution then was transferred to a one-quart can and set aside at room temperature. The next day the viscosity at 24° C. was found to be 32,400 cps. A 0.005" wet film was drawn onto a glass plate and found to be nearly free of imperfections. A portion of the 30% NVS solution then was diluted to 15% NVS with tetrahydrofuran, and the viscosity at 23° C. was determined to be 580 cps.

EXAMPLE 9

The procedure of Example 8 was repeated except that 0.4 g of monoisopropanolamine dissolved in 2 ml of isopropyl alcohol was employed in place of the ethylamine solution of Example 8. No sticking of the granules was observed, and the can was shaken immediately after closing to distribute the liquid. The viscosity of the 30% NVS solution was 41,600 cps at 24° C. and the film drawn from this solution contained a few more tiny gel particles than the film of Example 8, but nevertheless was of far better quality than all films prepared from solutions of the untreated polyurethane. Upon reduction to 15% NVS with tetrahydrofuran, the viscosity was 750 cps. If tetrahydrofuran had been the only solvent, the viscosity probably would have been within the manufacturer's specification of 400–700 cps at 25° C.

EXAMPLE 10

Using the procedure of Example 8, 200 g of the granulated thermoplastic polyurethane of Examples 1 and 2 was treated with 1.2 ml n-octylamine diluted with 1.0 ml toluene. The amine solution had a slight tendency to cause sticking of the granules, but not so much that the sticking could not be disrupted by stirring the mixture with a spatula; the can was closed after about 20 seconds' stirring. In place of toluene for dilution of the 35% solution to 30% NVS, additional dimethylformamide was used. The film from this 30% solution was of excellent quality. A portion of the 30% solution was diluted to 15% NVS with dimethylformamide, and the viscosity at 25° C. determined to be 1,120 cps.

EXAMPLE 11

A 10% solution of dimethylamine in benzene was prepared by bubbling the gaseous amine into the cold solvent. Using the procedure of Example 8, the granulated thermoplastic polyurethane of Example 5 (200 g) was treated with 1.5 ml of the dimethylamine solution. The can was closed immediately upon introduction of the solution from a syringe so as to prevent evaporation losses. The dimethylformamide solution was diluted to 30% NVS with methyl ethyl ketone instead of toluene, and the film from this solution, like that of Example 5, was of excellent quality. A portion of the 30% solution was diluted to 15% NVS with tetrahydrofuran, and the viscosity was found to be 700 cps at 24° C.

It is to be understood that the invention is not to be limited to the exact details of operation or structures shown and described, as obvious modifications and equivalents will be apparent to one skilled in the art.

I claim:

1. A process for treating polyurethanes of higher than desired molecular weight to reduce the molecular weight thereof which comprises treating the polyurethane with a basic primary or secondary amine under conditions which cause scission of the polymer linkages by aminolysis and in an amount which causes only partial aminolysis, in which the polyurethane is treated with the amine in two stages, first, at a temperature below that at which appreciable aminolysis takes place until substantial diffusion of the amine into and throughout the polyurethane is obtained and, second, at a temperature sufficient to promote aminolysis, but low enough to prevent substantial thermal degradation, and recovering as product a polyurethane of lower average molecular weight than the starting polyurethane and, prior to the recovery step, dissolving the polyurethane in an inert solvent therefor.

2. The process of claim 1, in which the contact between the amine and the polyurethane in the first stage is with the polyurethane in a solid particulate state.

3. The process of claim 2, in which the amine is nonsolvent for the polyurethane whereby the solid particles of polyurethane do not agglomerate.

4. The process of claim 3, in which the amine treated polyurethane is admixed with an inert solvent for polyurethane and the admixture is heated with stirring.

5. The process of claim 4, in which the admixture is first heated to a temperature not greater than about 60° C. and, thereafter, at a temperature sufficiently higher to promote aminolysis but not substantially greater than about 120° C.

6. The process of claim 5, in which the amine is an aliphatic or cycloaliphatic hydrocarbon amine having at least 7 carbon atoms and not more than 12 carbon atoms.

7. The process of claim 6, in which the amine is dibutylamine.

8. The process of claim 1, in which the amount of amine is between about 0.01 and 10 percent based on the weight of the polyurethane.

9. The process of claim 5, in which the amount of amine is between about 0.01 and 10 percent based on the weight of the polyurethane.

10. The process of claim 6, in which the amount of amine is between about 0.01 and 10 percent based on the weight of the polyurethane.

11. The process of claim 7, in which the amount of amine is between about 0.01 and 10 percent based on the weight of the polyurethane.

12. A process for treating polyurethanes which contain dispersed therein gel particles for the purpose of reducing the molecular weight and the content of such gel particles which comprises treating the polyurethane with a basic primary or secondary amine under conditions which cause scission of both linear linkages and cross-linkages characteristic of the polyurethane being treated by aminolysis, and in an amount which causes only partial aminolysis, in which the polyurethane is treated with the amine in two stages, first, at a temperature below that at which appreciable aminolysis takes place until substantial diffusion of the amine into and throughout the polyurethane is obtained and, second, at a temperature sufficient to promote aminolysis, but low enough to prevent substantial thermal degradation, and recovering as product a polyurethane which has a lower average molecular weight than the the starting polyurethane, and which is essentially free of gel particles and, prior to the recovery step, dissolving the polyurethane in an inert solvent therefor.

13. The process of claim 12, in which the temperature in the first stage is not greater than about 60° C., and that in the second stage is greater than that in the first stage, but not substantially greater than about 120° C.

14. The process of claim 13, in which the amine is an aliphatic or cycloaliphatic hydrocarbon amine having at least 7 carbon atoms and not more than 12 carbon atoms.

15. The process of claim 14, in which the amine is dibutylamine.

16. The process of claim 12, in which the amount of amine is between about 0.01 and 10 percent based on the weight of the polyurethane.

17. The process of claim 15, in which the amount of amine is between about 0.01 and 10 percent based on the weight of the polyurethane.

18. A solution of polyurethane in an inert solvent obtained by the process of claim 1.

19. A solution of polyurethane in an inert solvent obtained by the process of claim 12.

* * * * *

UNITED STATES PATENT AND TRADEMARK OFFICE
CERTIFICATE OF CORRECTION

PATENT NO. : 4,146,699
DATED : March 27, 1979
INVENTOR(S) : William H. Cook

It is certified that error appears in the above-identified patent and that said Letters Patent are hereby corrected as shown below:

[57] ABSTRACT, line 7; "cross linkages." should read -- crosslinkages. --
Col. 7, line 60; "3.048" should read -- 3,048 --
Col. 8, line 63; "one quart" should read -- one-quart --
Col. 12, line 58; "being" should read -- bring --
Col. 13, line 47; "or" should read -- of --

Signed and Sealed this

Twenty-first Day of August 1979

[SEAL]

Attest:

Attesting Officer

LUTRELLE F. PARKER
Acting Commissioner of Patents and Trademarks